(12) United States Patent
Oguni

(10) Patent No.: US 9,159,492 B2
(45) Date of Patent: Oct. 13, 2015

(54) LAMINATED CERAMIC CAPACITOR HAVING A COVERING LAYER

(71) Applicant: MURATA MANUFACTURING CO., LTD., Nagaokakyo-shi, Kyoto-Fu (JP)

(72) Inventor: Toshimi Oguni, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 28 days.

(21) Appl. No.: 13/957,546

(22) Filed: Aug. 2, 2013

(65) Prior Publication Data

US 2013/0314841 A1    Nov. 28, 2013

Related U.S. Application Data

(63) Continuation of application No. PCT/JP2012/054466, filed on Feb. 23, 2012.

(30) Foreign Application Priority Data

Mar. 3, 2011    (JP) .................. 2011-046315

(51) Int. Cl.
*H01G 4/018*    (2006.01)
*C04B 35/468*   (2006.01)
*H01G 4/30*     (2006.01)
(Continued)

(52) U.S. Cl.
CPC ............. *H01G 4/018* (2013.01); *B32B 18/00* (2013.01); *C04B 35/4682* (2013.01);
(Continued)

(58) Field of Classification Search
CPC ... H01G 4/018; H01G 4/1218; H01G 4/1227; H01G 4/1245; H01G 4/12; H01G 4/30
USPC .................... 361/303, 321.2, 301.4
See application file for complete search history.

(56) References Cited

U.S. PATENT DOCUMENTS 5,812,363 A * 9/1998 Kuroda et al. ............. 361/306.3
5,989,726 A * 11/1999 Noji et al. ..................... 428/594
(Continued)

FOREIGN PATENT DOCUMENTS

| JP | 04096310 A * | 3/1992 |
| JP | 2000311828 A | 11/2000 |
| JP | 2005-268712 A | 9/2005 |
| JP | 2006-347799 A | 12/2006 |
| JP | 2011-124529 A | 6/2011 |

OTHER PUBLICATIONS

PCT/JP2012/054466 Written Opinion dated May 17, 2012.
(Continued)

*Primary Examiner* — David M Sinclair
(74) *Attorney, Agent, or Firm* — Arent Fox LLP

(57) ABSTRACT

A laminated ceramic capacitor that includes dielectric layers stacked adjacent one another to form a laminated body; internal electrodes arranged between the dielectric layers; external electrodes along surfaces of the laminated body and connected to the internal electrodes; and a covering layer covering at least portions of sections of the laminated body between the laminated body and edges of the external electrodes. The external electrodes include a silver-containing layer containing at least Ag as its main constituent. The dielectric layers and the covering layer 30 contain, as their main constituent, a perovskite compound represented by a chemical formula $ABO_3$, wherein A is at least one of Ba, Sr, and Ca, and B is at least one of Ti, Zr, and Hf. V is added to only the dielectric layers among the dielectric layers and the covering layer.

7 Claims, 2 Drawing Sheets

(51) Int. Cl.
*H01G 4/12* (2006.01)
*B32B 18/00* (2006.01)

(52) U.S. Cl.
CPC .......... *H01G 4/1227* (2013.01); *H01G 4/1245* (2013.01); *H01G 4/30* (2013.01); *C04B 2235/3206* (2013.01); *C04B 2235/3215* (2013.01); *C04B 2235/3224* (2013.01); *C04B 2235/3239* (2013.01); *C04B 2235/3262* (2013.01); *C04B 2235/3418* (2013.01); *C04B 2235/5445* (2013.01); *C04B 2235/6582* (2013.01); *C04B 2235/6584* (2013.01); *C04B 2235/6588* (2013.01); *C04B 2237/346* (2013.01); *C04B 2237/582* (2013.01); *C04B 2237/704* (2013.01)

(56) References Cited

U.S. PATENT DOCUMENTS

| | | | | |
|---|---|---|---|---|
| 6,134,098 | A | * | 10/2000 | Kuroda et al. ............. 361/321.2 |
| 6,563,690 | B2 | * | 5/2003 | Kishi et al. .................... 361/312 |
| 8,179,225 | B2 | * | 5/2012 | Iguchi et al. .................... 338/21 |
| 2005/0094350 | A1 | * | 5/2005 | Kobayashi et al. ........ 361/306.3 |
| 2007/0242416 | A1 | * | 10/2007 | Saito et al. ................. 361/321.1 |
| 2011/0141660 | A1 | | 6/2011 | Jeong et al. |

OTHER PUBLICATIONS

PCT/JP2012/054466 ISR dated May 17, 2012.

* cited by examiner

LAMINATED CERAMIC CAPACITOR HAVING A COVERING LAYER

CROSS-REFERENCE TO RELATED APPLICATIONS

The present application is a continuation of International application No. PCT/JP2012/054466, filed Feb. 23, 2012, which claims priority to Japanese Patent Application No. 2011-046315, filed Mar. 3, 2011, the entire contents of each of which are incorporated herein by reference.

FIELD OF THE INVENTION

The present invention relates to a laminated ceramic capacitor, and relates to a laminated ceramic capacitor in which a dielectric layer contains, as its main constituent, a perovskite compound such as barium titanate ($BaTiO_3$).

BACKGROUND OF THE INVENTION

Conventionally, laminated ceramic capacitors have been advancing with reduction in thickness for dielectric layers containing, as their main constituent, barium titanate ($BaTiO_3$) or the like, in order to achieve the reduction in size and the increase in capacitance.

However, there is a possibility that the reduction in thickness for the dielectric layers will increase the electric field intensity applied to the dielectric layers, thereby leading to a decrease in withstanding voltage or in reliability against high-temperature and high-electric-field loading tests.

When the resistance distribution is broad in the dielectric, an electric field is concentrated on higher-resistance points to decrease the insulation resistance as an element in a short period of time. In order to avoid this decrease, a dielectric ceramic which has excellent reliability against high-temperature and high-electric-field load is achieved by adding V to a barium titanate or a barium titanate partially substituted with Ca as a main constituent for dielectric layers (for example, see Patent Document 1).

Patent Document 1: JP 2000-311828 A

SUMMARY OF THE INVENTION

The environments for the use of laminated ceramic capacitors have been also increasingly severe, and these days, laminated ceramic capacitors have been also used in environments reaching temperatures exceeding 125° C. in some cases. In such cases, mounting onto substrates with solder, which has been common to date, has the problem of deterioration in joint strength and connection resistance with time.

In order to solve this problem, conductive adhesives containing Ag as a filler are increasingly used for mounting onto substrates when laminated ceramic capacitors are used at high temperatures exceeding 125° C. In addition, as laminated ceramic capacitors, the surfaces of external electrodes are changed from plating to sintered metal containing Ag to ensure the joint strengths with the conductive adhesives.

However, the Ag contained in the external electrodes and the conductive adhesives turns into silver compounds such as a silver oxide ($Ag_2O$), a silver chloride ($AgCl$), and a silver sulfide ($Ag_2S$). This silver compound is brought into contact with the ceramic in dielectric layers, which is obtained by adding V to barium titanate or barium titanate partially substituted with Ca as a main constituent, and when an electric field is applied in a high-temperature environment, the silver will penetrate into the dielectric layers to alter the ceramic.

The present invention is, in view of the circumstances, intended to provide a laminated ceramic capacitor capable of suppressing alterations of a ceramic even when V is added to a dielectric layer.

The present invention provides, in order to solve the problems described above, a laminated ceramic capacitor configured as follows.

The laminated ceramic capacitor includes: (a) dielectric layers stacked adjacent one another to form a laminated body; (b) internal electrodes arranged between the dielectric layers of the laminated body; (c) external electrodes formed along surfaces of the laminated body and connected to the internal electrodes, which include a silver-containing layer containing at least Ag as its main constituent; and (d) a covering layer for covering at least portions of sections covered with the external electrodes, among the surfaces of the laminated body along which edges of the external electrodes lie. The dielectric layers and the covering layer contain, as their main constituent, a perovskite compound represented by a chemical formula "$ABO_3$" when at least one of Ba, Sr, and Ca is denoted by "A", at least one of Ti, Zr, and Hf is denoted by "B", and oxygen is denoted by "O". Among the dielectric layers and the covering layer, V is added to only the dielectric layers.

It is to be noted that the main constituent $ABO_3$ may deviate from the stoichiometric composition in some cases. Specifically, the ratio A/B in terms of mol between A and B preferably falls within the range of 0.98 to 1.05.

In addition, the dielectric layers and the covering layer may be identical or different in terms of composition other than V.

In the configuration described above, V is added to the dielectric layers, and the withstanding voltage and the reliability against high-temperature and high-electric-field loading tests can be ensured even when the dielectric layers are reduced in thickness.

According to the configuration described above, the laminated body of the laminated ceramic capacitor is covered with the covering layer to which V is not added, and silver is thus less likely to penetrate into the covering layer even under high temperature and electric field in an environment in contact with a silver compound through the alteration of silver contained in the silver-containing layers of the external electrodes. Therefore, even when the laminated ceramic capacitor is placed under high-temperature and electric field in an environment in contact with the silver compound, no silver penetrates into the ceramic of the laminated body, and the ceramic is less likely to be altered by high-temperature and high-electric-field load.

Preferably, the silver-containing layer is a conductive resin containing Ag metal particles.

In this case, external electrodes of electronic components can be easily mounted on circuit boards, etc.

Preferably, the difference in material composition between the dielectric layers and the covering layer is only that V is added to the dielectric layers whereas V is not added to the covering layer.

In this case, it is easy to prepare respective materials for the dielectric layers and the covering layer.

Preferably, the laminated body has a cuboid shape. The internal electrodes are exposed at a pair of mutually opposed end surfaces of the laminated body. The covering layer covers the four surfaces of the laminated body, other than the end surfaces.

In this case, the laminated body is simply covered with the covering layer.

According to the present invention, alterations of the ceramic can be suppressed even when V is added to the dielectric layers.

DETAILED DESCRIPTION OF THE INVENTION

An experimental example will be described below as an embodiment of the present invention.

Experimental Example

A laminated ceramic capacitor 10 according to an experimental example of the present invention will be described with reference to FIGS. 1(a), 1(b) and 2.

Figure 1A:
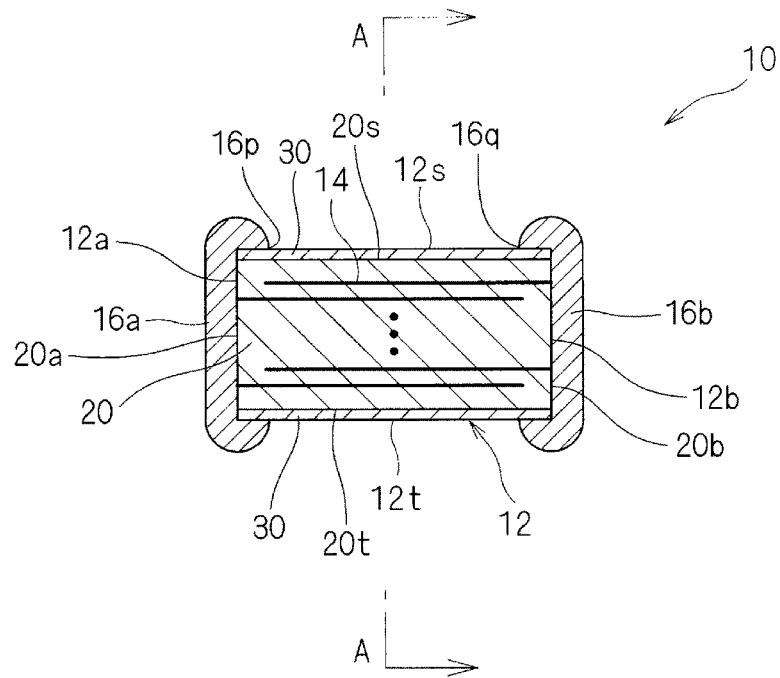
FIGS. 1(a) and 1(b) are cross-sectional views of a laminated ceramic capacitor. (Experimental Example)
Figure 1B:
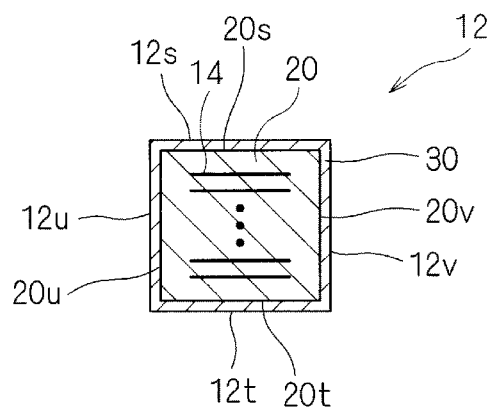

FIG. 1(a) is a cross-sectional view of the laminated ceramic capacitor 10. FIG. 1(b) is a cross-sectional view of FIG. 1(a) along the line A-A. As shown in FIGS. 1(a) and 1(b), the laminated ceramic capacitor 10 has external electrodes 16a, 16b formed on a pair of end surfaces 12a, 12b of a main body 12. Internal electrodes 14 are formed within the main body 12. The internal electrodes 14 are exposed alternately at the end surfaces 12a, 12b, and connected to the external electrodes 16a, 16b. The main body 12 is provided with a covering layer 30 exposed on four surfaces 12s, 12t, 12u, and 12v other than the end surfaces 12a, 12b. More specifically, the covering layer 30 entirely covers, among the surfaces 20a, 20b, 20s, 20t, 20u, 20v of the laminated body 20, the respective surfaces 20s, 20t, 20u, 20v along which edges 16p, 16q of the external electrodes 16a, 16b lie.

The external electrodes 16a, 16b include a silver-containing layer containing at least Ag as its main constituent. For example, the silver-containing layer, which is a conductive resin containing Ag metal particles, is formed by applying and drying the conductive resin containing Ag metal particles.

Figure 2:
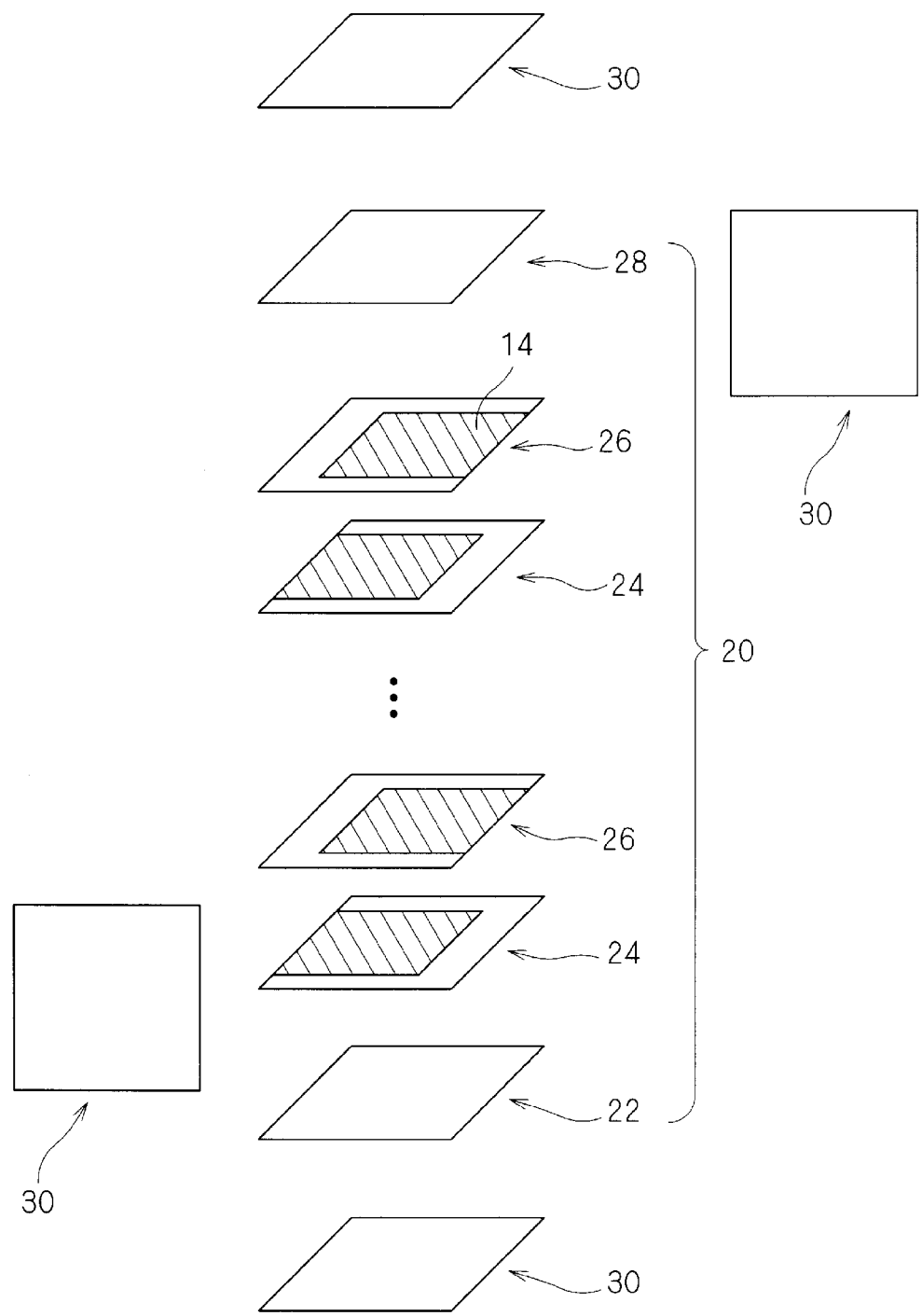
FIG. 2 is an exploded perspective view of a main body of the laminated ceramic capacitor. (Experimental Example)

FIG. 2 is an exploded perspective view schematically illustrating the configuration of the main body 12. As shown in FIG. 2, the main body 12 includes the laminated body 20 which have dielectric layers 22, 24, 26, 28 stacked, and the covering layer 30 covering the four surfaces of the laminated body 20. The internal electrodes 14 are formed on principal surfaces of the certain dielectric layers 24, 26 of the laminated body 20.

The dielectric layers 22, 24, 26, 28 of the laminated body 20 are dielectric ceramic layers containing, as their constituent, a perovskite compound such as barium titanate ($BaTiO_3$).

The perovskite compound is represented by a chemical formula "$ABO_3$" when at least one of Ba, Sr, and Ca is denoted by "A", at least one of Ti, Zr, and Hf is denoted by "B", and oxygen is denoted by "O".

V is added to the dielectric layers 22, 24, 26, 28 of the laminated body 20.

The covering layer 30 has, except that V is not added thereto, the same composition as the dielectric layers 22, 24, 26, 28 of the laminated body 20. More specifically, the covering layer 30 is a dielectric ceramic layer without V present therein. When V is 0.01 parts by mol or less with respect to 100 parts by mol of the B component in the ceramic constituent of the covering layer 30 herein, it is considered that "V is not added" or that "V is present only in."

Even when the laminated ceramic capacitor 10 thus including the main body 12 with the laminated body 20 covered with the covering layer 30 is placed under high temperature and electric field in an environment where the covering layer 30 of the main body 12 of the laminated ceramic capacitor 10 is brought into contact with a silver compound, no silver penetrates into the ceramic of the laminated body 20 of the main body 12, and the ceramic is less likely to be altered by high-temperature and high-electric-field load. Thus, the reliability of the laminated ceramic capacitor 10 can be ensured because the electrical characteristics are less likely to be changed.

Next, a laminated ceramic capacitor made as a prototype will be described.

In order to prepare a dielectric raw material, $BaCO_3$ and $TiO_2$ powders were prepared, weighed in predetermined amounts so that the molar ratio of Ba to Ti was 1, and then, with addition of pure water and a dispersant, subjected to a grinding and crushing treatment by using a forced-circulation type wet grinder (with use of PSZ media). The treated slurry was dried in an oven, and then subjected to a heat treatment at a temperature of 950° C. or higher, thereby providing a first powder with an average grain size of 0.15 to 0.25 µm.

Subsequently, in addition to the first powder, $BaCO_2$, $Dy_2O_2$, $MgCO_3$, $MnCO_3$, $SiO_2$, and $V_2O_5$ powders were prepared, weighed in predetermined amounts so as to provide the additional additive amounts of Ba, Dy, Mg, Mn, Si, and V in terms of parts by mol as shown in Table 1 with respect to 100 parts by mol of the Ti in the first powder, and then, with addition of pure water and a dispersant, subjected to a grinding and crushing treatment by using a forced-circulation type wet grinder (with use of PSZ media). The treated slurry was dried in an oven to obtain a dielectric raw material.

Further, it has been confirmed by an ICP emission spectrometric analysis that the obtained raw material powder is nearly identical to the prepared compositions shown in Table 1 below.

TABLE 1

| Ba Amount (parts by mol) | Dy Amount (parts by mol) | Mg Amount (parts by mol) | Mn Amount (parts by mol) | Si Amount (parts by mol) | V Amount (parts by mol) |
| --- | --- | --- | --- | --- | --- |
| 1.8 | 2.0 | 1.0 | 0.3 | 1.5 | 0.14 |

The prepared dielectric raw material powder was, with the addition of a polyvinyl butyral binder and an organic solvent such as ethanol thereto, subjected to wet mixing in a ball mill to prepare ceramic slurry. This ceramic slurry was subjected to sheet forming by a doctor blade method or the like so that fired dielectric layers were 7.0 µm in thickness, thereby providing rectangular green sheets. Next, a conductive paste containing Ni was applied by screen printing onto the green sheets, thereby forming conductive layers to serve as internal electrodes.

In order to form a laminated body, 10 of the green sheets before applying the conductive paste by printing were stacked first, and 100 of the green sheets with the conductive paste printed were stacked thereon so as to alternate the sides to which the conductive paste was drawn. Thereafter, 10 of the green sheets before applying the conductive paste by printing were stacked again, and the stacked body was cut into individual pieces to obtain laminated bodies. These are samples of experimental run numbers 1, 5, 10, and 15 in Table 2 shown later.

On the other hand, a raw material with only the $V_2O_5$ eliminated from the dielectric raw material was prepared by the same method as described above, and with addition of a polyvinyl butyral binder and an organic solvent such as ethanol thereto, subjected to wet mixing in a ball mill to prepare ceramic slurry. This ceramic slurry was subjected to sheet forming by a doctor blade method or the like, thereby providing rectangular green sheets of 15 μm in thickness.

Among the green sheets formed from the raw material with only the $V_2O_5$ eliminated, a desired number of sheets were subjected to pressure bonding onto four surfaces of the laminated bodies other than end surfaces thereof, thereby providing main bodies without V present on the surfaces other than the end surfaces. These are samples of experimental run numbers 2 to 4, 6 to 8, 11 to 13, and 16 to 18 in Table 2 shown later.

Furthermore, a raw material with the additional additive amount of V adjusted to 0.01 parts by mol with respect to 100 parts by mol of the Ti in the first powder as compared with the dielectric raw material was prepared by the same method as described above, and with addition of a polyvinyl butyral binder and an organic solvent such as ethanol thereto, subjected to wet mixing in a ball mill to prepare ceramic slurry. This ceramic slurry was subjected to sheet forming by a doctor blade method or the like, thereby providing rectangular green sheets of 15 μm in thickness.

Among the green sheets formed from the raw material containing 0.01 parts by mol of V, a desired number of sheets were subjected to pressure bonding onto four surfaces of the laminated bodies other than end surfaces thereof, thereby providing main bodies without V present on the surfaces other than the end surfaces. These are samples of experimental run numbers 9, 14, and 19 in Table 2 shown later.

The laminated bodies provided, by pressure bonding, with the green sheets formed from the raw material with only the $V_2O_5$ eliminated, and for comparison, a laminated body provided, by pressure bonding, with none of the green sheets formed from the raw material with only the $V_2O_5$ eliminated (that is, the laminated body itself) were each subjected to a binder removal treatment by heating to 250° C. in a $N_2$ atmosphere, and to firing at a maximum temperature of 1200 to 1300° C. and an oxygen partial pressure of $10^{-9}$ to $10^{-10}$ MPa in a reducing atmosphere composed of $H_2$—$N_2$—$H_2O$ gases, thereby providing sintered ceramic laminated bodies.

A Cu paste containing $B_2O_2$—$Li_2O_2$—$SiO_2$—BaO based glass frit was applied to both end surfaces of the sintered ceramic laminated bodies obtained, and baked at a temperature of 850° C. in a $N_2$ atmosphere to form external electrodes electrically connected to the internal electrodes, thereby providing laminated ceramic capacitors according to the experimental examples and the comparative examples.

The laminated ceramic capacitors obtained in the way described above were about 1.2 mm in width, 2.0 mm in length, and about 1.1 mm in thickness, and the dielectric ceramic layers sandwiched between the internal electrodes of the capacitor were 7.0 μm in thickness.

It is to be noted that while laminated ceramic capacitors as products are formed so that external electrodes include a silver-containing layer containing at least Ag as its main constituent, the external electrodes of the laminated ceramic capacitors made as prototypes according to the experimental examples and the comparative examples have no silver-containing layer formed therein, because the prototypes are used in a simulation test for which the external electrodes have silver-containing layers protruding and adhering to the laminated ceramic capacitors.

The test using the laminated ceramic capacitors made as prototypes according to the experimental examples and the comparative examples was carried out as follows.

A silver compound powder of $Ag_2O$, AgCl, or $Ag_2S$, or a metal silver powder of Ag mixed with 40 vol % of epoxy resin was applied onto one of the external electrodes so as to come into contact with both the ceramic body and the Cu external electrode, but so as not to cover a portion of the Cu external electrode on the end surface, which was connected to a connection terminal, for being able to ensure an electrical connection, and cured at a temperature of 175° C. to obtain a test sample.

While using, as an anode, the external electrode with the applied epoxy mixed with the silver compound powder or the metal silver powder, a voltage of DC 100 V was applied and held for 150 hours under an environment at 175° C. In order to keep the silver compound and silver powder contained in the epoxy resin from being affected by the atmosphere gas during this test, the test was carried out with the sample and connection terminal covered with a silicone resin after connecting to a power source.

After completion of the test, the portion in contact with the epoxy resin mixed with the silver compound powder or the silver powder and 50 μm away from the Cu external electrode was cut in the stacking direction to expose a vertical cross section (WT cross section) of the ceramic body (main body), and the exposed cross section was subjected to an ICP analysis using a laser abrasion method to detect Ag and V. When there was a point at which Ag was detected somewhere in the exposed cross section 10 μm or more inside from the body surface layer (the surface of the main body), it was determined that the penetration of Ag was observed. In addition, among the points at which more than 0.01 parts by mol of V was detected with respect to 100 parts by mol of Ti, the shortest distance from the body surface layer was regarded as a thickness without V present.

The test results are shown in Table 2 below.

TABLE 2

| | Type of Mixed Silver Compound | Sheet without V V Content | Sheet without V (15 μm thickness) The Number of Sheet Stacked | Sheet with V V Additive Amount | Thickness of Layer without V | Penetration of Silver |
|---|---|---|---|---|---|---|
| 1 * | Ag | 0 mol % | 0 | 0.14 mol % | 0 μm | No |
| 2 | Ag | 0 mol % | 3 | 0.14 mol % | 43 μm | No |
| 3 | Ag | 0 mol % | 6 | 0.14 mol % | 86 μm | No |
| 4 | Ag | 0 mol % | 9 | 0.14 mol % | 130 μm | No |
| 5 * | Ag2O | 0 mol % | 0 | 0.14 mol % | 0 μm | Yes |
| 6 | Ag2O | 0 mol % | 3 | 0.14 mol % | 40 μm | No |
| 7 | Ag2O | 0 mol % | 6 | 0.14 mol % | 84 μm | No |
| 8 | Ag2O | 0 mol % | 9 | 0.14 mol % | 127 μm | No |

TABLE 2-continued

| | Type of Mixed Silver Compound | Sheet without V V Content | Sheet without V (15 μm thickness) The Number of Sheet Stacked | Sheet with V V Additive Amount | Thickness of Layer without V | Penetration of Silver |
|---|---|---|---|---|---|---|
| 9 | Ag2O | 0.01 mol % | 3 | 0.14 mol % | 44 μm | No |
| 10 * | AgCl | 0 mol % | 0 | 0.14 mol % | 0 μm | Yes |
| 11 | AgCl | 0 mol % | 3 | 0.14 mol % | 41 μm | No |
| 12 | AgCl | 0 mol % | 6 | 0.14 mol % | 85 μm | No |
| 13 | AgCl | 0 mol % | 9 | 0.14 mol % | 124 μm | No |
| 14 | AgCl | 0.01 mol % | 3 | 0.14 mol % | 44 μm | No |
| 15 * | Ag2S | 0 mol % | 0 | 0.14 mol % | 0 μm | Yes |
| 16 | Ag2S | 0 mol % | 3 | 0.14 mol % | 38 μm | No |
| 17 | Ag2S | 0 mol % | 6 | 0.14 mol % | 84 μm | No |
| 18 | Ag2S | 0 mol % | 9 | 0.14 mol % | 128 μm | No |
| 19 | Ag2S | 0.01 mol % | 3 | 0.14 mol % | 41 μm | No |

Mark * outside the scope of the present invention

In Table 2, the "Type of Mixed Silver Compound" refers to the type of the silver compound powder or metal silver powder contained in the epoxy brought into contact with both the ceramic body and the Cu external electrode. The "Sheet without V" refers to the green sheet formed from the raw material with only the $V_2O_5$ eliminated, or the green sheet formed from the raw material containing 0.01 parts by mol of V with respect to 100 parts by mol of Ti, which was subjected to pressure bonding onto the four surfaces of the laminated body. The "Thickness of Layer without V" is almost equal to the thickness of the fired green sheet formed from the raw material with only the $V_2O_5$ eliminated, or the fired green sheet formed from the raw material containing 0.01 parts by mol of V with respect to 100 parts by mol of Ti, which was subjected to pressure bonding onto the four surfaces of the laminated body (the thickness of the covering layer). The experimental run numbers 1, 5, 10, and 15 with the mark * represent comparative examples.

The following is determined from Table 2.

From the experimental run numbers 1, 2, 3, and 4, it is determined that in the case of the metal silver powder mixed, the penetration of Ag is not caused regardless of the presence or absence of the layer without V (covering layer). This is a simulation without corrosion of Ag, from which it is determined migration is not caused.

From the experimental run numbers 5, 10, and 15, it is determined that in the case of the silver compound powder mixed, the penetration of Ag is caused in all of the samples without the layer without V (covering layer), regardless of the type of the silver compound mixed.

From the experimental run numbers 6, 7, 8, 9, 11, 12, 13, 14, 16, 17, 18, and 19, it is determined that in the case of the silver compound powder mixed, the penetration of Ag is not caused in all of the samples with the layer without V (covering layer), regardless of the type of the silver compound mixed.

More specifically, in the case of the silver compound in contact with the surface of the main body of the laminated ceramic capacitor, Ag penetrates into the ceramic of the main body in a high-temperature and high-electric-field environment when V is present in the surface layer of the main body of the laminated ceramic capacitor, whereas no Ag penetrates into the ceramic of the main body even in a high-temperature and high-electric-field environment when no V is present in the surface layer of the main body of the laminated ceramic capacitor.

Therefore, even when the configuration with no V present in the surface layer of the main body is placed under high temperature and electric field in an environment in contact with a silver compound, no silver penetrates into the ceramic of the main body, thereby achieving a laminated ceramic capacitor which is less likely to be altered by high-temperature and high-electric-field load.

CONCLUSION

As described above, in the laminated body of the dielectrics stacked, which is covered with the covering layer with no V added thereto, alterations of the ceramic can be suppressed even when V is added to the dielectric layers.

It is to be noted that the present invention is not to be considered limited to the embodiment described above, and various modifications can be made in the practice of the present invention.

For example, there is a great effect preferably in the case where the sections covered with the external electrodes 16a, 16b are entirely covered with the covering layer 30, among the surfaces 20s, 20t, 20u, 20v of the laminated body 20 along which the edges 16p, 16q of the external electrodes 16a, 16b lie as shown in FIG. 1, but the present invention is not to be considered limited to this case. The covering layer 30 only has to cover at least portions of the sections covered with the external electrodes 16a, 16b, among the surfaces 20s, 20t, 20u, 20v of the laminated body 20 along which the edges 16p, 16q of the external electrodes 16a, 16b lie, and may be formed on only some of the surfaces 20s, 20t, 20u, 20v of the laminated body 20 along which the edges 16p, 16q of the external electrodes 16a, 16b lie.

DESCRIPTION OF REFERENCE SYMBOLS 10 laminated ceramic capacitor
12 main body
14 internal electrode
16a, 16b external electrode
16p, 16q edge
20 laminated body
20a, 20b, 20s, 20t, 20u, 20v surface
22, 24, 26, 28 dielectric layer
30 covering layer

The invention claimed is:
1. A laminated ceramic capacitor comprising:
 a laminated body having dielectric layers stacked adjacent one another and internal electrodes arranged between the dielectric layers;
 external electrodes on surfaces of the laminated body and connected to the internal electrodes, the external electrodes including a silver-containing, layer containing at least Ag as a main constituent thereof; and a covering layer covering at least portions of sections of the laminated body between the laminated body and edges of the external electrodes, wherein the dielectric layers and the covering layer contain, as their main constituent, a perovskite compound represented by a chemical formula $ABO_3$, wherein A is at least one of Ba, Sr, and Ca, and B is at least one of Ti, Zr, and Hf, among the dielectric layers and the covering layer, V is present only in the dielectric layers, the internal electrodes are not present in the covering layer, a thickness of the covering layer is 38 µm or greater, the laminated body has a cuboid shape, the internal electrodes are exposed at a pair of mutually opposed end surfaces of the laminated body, and the covering layer covers four surfaces of the laminated body other than the mutually opposed end surfaces.

2. The ceramic capacitor according to claim 1, wherein the silver-containing layer is a conductive resin containing Ag metal particles.

3. The laminated ceramic capacitor according to claim 2, wherein a difference in material composition between the dielectric layers and the covering layer is that V is present only in the dielectric layers.

4. The laminated ceramic capacitor according to claim 1, wherein a difference in material composition between the dielectric layers and the covering layer is that V is present only in the dielectric layers.

5. The laminated ceramic capacitor according to claim 1, wherein the internal electrodes are exposed at a pair of mutually opposed end surfaces of the laminated body, and the covering layer covers surfaces of the laminated body other than the mutually opposed end surfaces.

6. The laminated ceramic capacitor according to claim 1, wherein the perovskite compound is $BaTiO_3$.

7. The laminated ceramic capacitor according to claim 1, wherein the internal electrodes are exposed at a pair of mutually opposed end surfaces of the laminated body, and the covering layer covers at least the portions of the sections of the laminated body between the laminated body and the edges of the pair of external electrodes other than the mutually opposed end surfaces.

* * * * *